(12) United States Patent
Hauck et al.

(10) Patent No.: US 7,526,544 B2
(45) Date of Patent: Apr. 28, 2009

(54) MESSAGE TRACKING METHOD, APPARATUS, AND SYSTEM

(75) Inventors: Edward Lewis Hauck, Niwot, CO (US); Noel Simen Otterness, Lafayette, CO (US)

(73) Assignee: International Business Machines Corporation, Armonk, NY (US)

( * ) Notice: Subject to any disclaimer, the term of this patent is extended or adjusted under 35 U.S.C. 154(b) by 1477 days.

(21) Appl. No.: 10/116,951

(22) Filed: Apr. 5, 2002

(65) Prior Publication Data

US 2003/0191835 A1    Oct. 9, 2003

(51) Int. Cl.
*G06F 15/173* (2006.01)
(52) U.S. Cl. .................. 709/224; 709/206; 709/207; 709/254; 710/20; 379/88.18
(58) Field of Classification Search .............. 709/224, 709/206, 207, 254; 710/20; 379/88.18
See application file for complete search history.

(56) References Cited

U.S. PATENT DOCUMENTS

| | | | | |
|---|---|---|---|---|
| 5,875,175 A | * | 2/1999 | Sherer et al. | 370/230 |
| 6,088,516 A | * | 7/2000 | Kreisel et al. | 709/221 |
| 6,205,498 B1 | * | 3/2001 | Habusha et al. | 710/29 |
| 6,263,052 B1 | * | 7/2001 | Cruze | 379/88.18 |
| 6,279,050 B1 | * | 8/2001 | Chilton et al. | 710/20 |
| 6,732,185 B1 | * | 5/2004 | Reistad | 709/238 |
| 6,785,711 B1 | * | 8/2004 | Motoyama et al. | 709/206 |
| 6,854,007 B1 | * | 2/2005 | Hammond | 709/206 |

* cited by examiner

*Primary Examiner*—Tonia L Dollinger
*Assistant Examiner*—Kyung Hye Shin
(74) *Attorney, Agent, or Firm*—Ryan K. Simmons (57) ABSTRACT

A message tracker having a transfer monitor, a set of registers, and at least one arithmetic unit increases performance and reliability when transmitting or receiving messages within a computer system. A set of message parameters such as a current address, a remaining length, and a communicated length are stored within the set of registers. The transfer monitor observes data transfers on a multi-tenant bus in order to detect data transfers related to the message and provide an update signal. The message parameters within the registers are updated in response to the update signal. The process of detecting and updating is repeated until the entire message is transferred, and the message tracker then informs a control processor or process that communication of the message has occurred. To facilitate message coalescing, several message trackers may share a message queue that is configured to store message parameters corresponding to completed messages.

8 Claims, 7 Drawing Sheets

MESSAGE TRACKING METHOD, APPARATUS, AND SYSTEM

BACKGROUND OF THE INVENTION

1. The Field of the Invention

The invention relates to conducting efficient communications within computing systems and networks. More specifically, the invention relates to efficient messaging among redundant RAID controllers.

2. The Relevant Art

Networking has increased the need for messaging within computing environments. Data is often stored remotely and accessed by multiple computers and other electronic devices via electronic networks. A well-known technique to lower access latency and increase transfers rates is to locally store or "cache" frequently accessed data within fast local memory thus reducing the load on relatively slow transmission channels, links, and storage devices. Caching facilitates faster access speeds by temporarily storing the data of interest on the local system or device.

Caching often results in data records and files, or portions thereof, being distributed in disparate locations. Updating cached data records and files properly is problematic and is known in the art as maintaining cache coherency. Maintaining cache coherency typically involves tracking and monitoring of the various cached versions in a central register or database and sending update messages to update old data at the various disparate locations. Tracking, monitoring and updating has traditionally been expensive in that considerable processing cycles and/or specialized circuitry is required to maintain cache coherency and conduct messaging related to configuration, housekeeping, and error recovery operations.

RAID systems (i.e., systems using Redundant Arrays of Independent Disks) are used to store large quantities of data within computer and storage networks. RAID systems are designed to be fault resistant and fault tolerant by distributing data among redundant arrays of independent disks, usually with some form of error coding. RAID controllers are typically required to receive messages containing access requests and data from a host, acknowledge reception of the requests, and perform the requested transaction. To prevent a weak link within RAID systems, RAID controllers often operate in a dual active configuration where the controllers are paired and take over for each other in the event that one of the controllers fails.

Mirroring is a specific form of caching that is often conducted to maintain redundant copies and thereby facilitate recovering from system errors and failures. Mirroring is particularly desirable in active standby RAID controllers in that a standby controller must have a copy of certain segments of a failed controller's data to successfully recover from a failure and ensure that all write requests are successfully completed.

Mirroring is often an expensive and time-consuming operation. Mirroring requires extensive coordination in that update messages must be generated, received, acknowledged, and processed for every data element that is updated within a cache. The time needed to generate, receive, acknowledge, and process update messages increases a RAID systems vulnerability to unrecoverable errors.

In addition to update messages, additional messaging is required to conduct configuration, housekeeping, and error recovery operations related to data redundancy. What is needed is low-cost, high-speed method, apparatus and system for conducting efficient and effective messaging in distributed computer systems. Furthermore, what is particularly needed is a method and apparatus to track the transmission and reception of messages in distributed computer systems and thereby increase the throughput, efficiency and reliability of message communications. Such an apparatus and method is particularly needed in redundant RAID controllers.

OBJECTS AND BRIEF SUMMARY OF THE INVENTION

The apparatus of the present invention has been developed in response to the present state of the art, and in particular, in response to the problems and needs in the art that have not yet been fully solved by currently available messaging systems. Accordingly, it is an overall object of the present invention to provide an improved apparatus and method for conducting message communication that overcomes many or all of the above-discussed shortcomings in the art.

To achieve the foregoing object, and in accordance with the invention as embodied and broadly described herein in the preferred embodiments, a message tracking method, apparatus, and system are described that facilitate efficient and effective message communications.

The present invention uses message tracking to increase messaging efficiency, eliminate software handshaking, and reduce memory requirements when conducting messaging between components of a distributed computer system. Transmitted and received messages are tracked by monitoring data transfers on a multi-tenant bus. In the preferred embodiment, message parameters identifying completed messages are coalesced within a message queue from multiple message-tracking units. A communicating process or processor is then informed of the completed messages, for example, by asserting an interrupt signal to invoke an interrupt routine.

The message tracking apparatus of the present invention includes a transfer monitor, a set of registers, and one or more arithmetic units. The transfer monitor asserts an update signal in response to data transfers commencing at a current address. The registers store message parameters including the current address, while the arithmetic units update the message parameters in response to the update signal. In the preferred embodiment, completion of a message is detected by comparing a current length (i.e. a total transfer length or communicated length) with the intended message length. In response to completion, the communicating process or processor is informed of the completed message communications.

In accordance with the present invention, messages are efficiently transmitted by mirroring selected data transfers on a multi-tenant bus to a remote system via a communications link. Likewise, messages are efficiently received by conducting data transfers on the multi-tenant bus containing data received from the communications link. Mirroring of the selected data transfers is performed by a mirror table in conjunction with the communications link. The mirror table operates by mapping selected memory segments on a local system to corresponding memory segments on a remote system. One example of a mirror table suitable for use in the present application is described in a co-pending U.S. patent application entitled HIGH SPEED SELECTIVE MIRRORING OF CACHED DATA, filed on Apr. 5, 2002 and having a Ser. No. 10/116,945, which is hereby incorporated by reference into this document.

The messaging capabilities of the present invention were developed in response to the communication demands of RAID controllers. The present invention facilitates efficient messaging in several ways. First of all, since the mirror table mirrors all write operations within selected memory segments, messages may be sent as they are created within, or received into, a memory segment. Therefore, copying the message is not necessary, and the communicating process need not wait until the entire message is composed to initiate transmission.

Second, in the preferred embodiment message, tracking and coalescing is conducted primarily in hardware, thereby substantially eliminating context switches within a control program or process. Third, message tracking follows the actual bus transfers associated with a message, thereby facilitating the elimination or reduction of software handshaking and/or response messages.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and objects of the invention are obtained will be readily understood, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
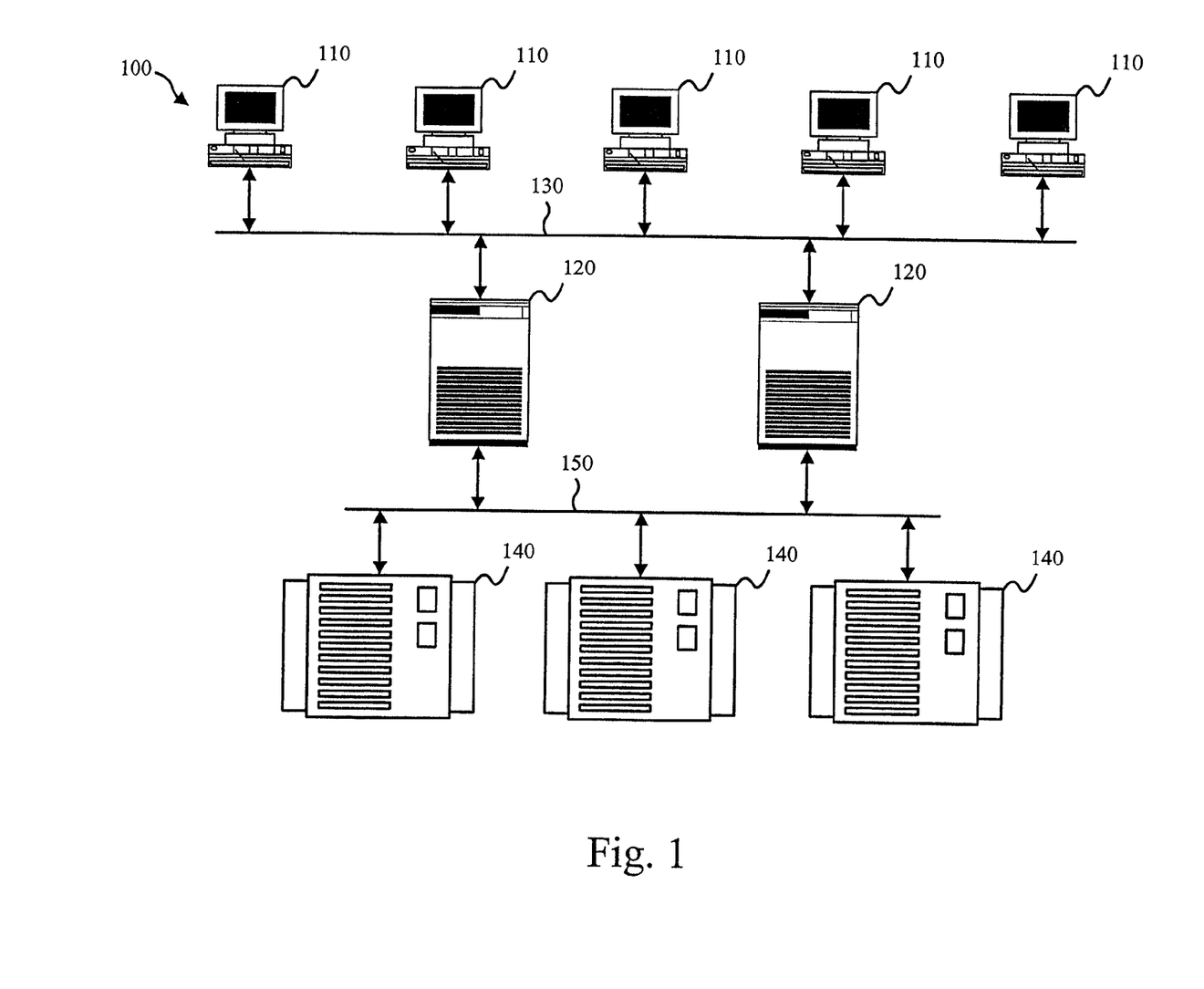
FIG. 1 is a block diagram illustrating a representative RAID network in accordance with the present invention.

FIG. 1 shows a representative RAID network 100 suitable for use with the present invention. The RAID network 100 as shown includes a number of workstations 110 and servers 120 interconnected by a local area network 130. The servers 120 maybe configured to provide specific services such as print services, storage services, Internet access, or the like.

In the depicted embodiment, the servers 120 provide storage services to the local area network 130 via one or more storage arrays 140. The servers 120 are interconnected with the storage arrays 140 through a storage network 150. In one embodiment, the storage network 150 is a local area network in which the servers 120 and the storage arrays 140 are housed within the same facility or campus. In another embodiment, the storage network 150 is a wide area network with the servers 120 and the storage arrays 140 housed in geographically disparate locations. The storage arrays 140 are preferably organized in a redundant array of independent disks (RAID) configuration.

The RAID network 100 is preferably configured to bear large amounts of traffic, particularly data packets and messaging packets related to data storage, retrieval, and maintenance. The present invention provides means and methods to facilitate efficient and effective messaging within a network such as the RAID network 100.

Figure 2:
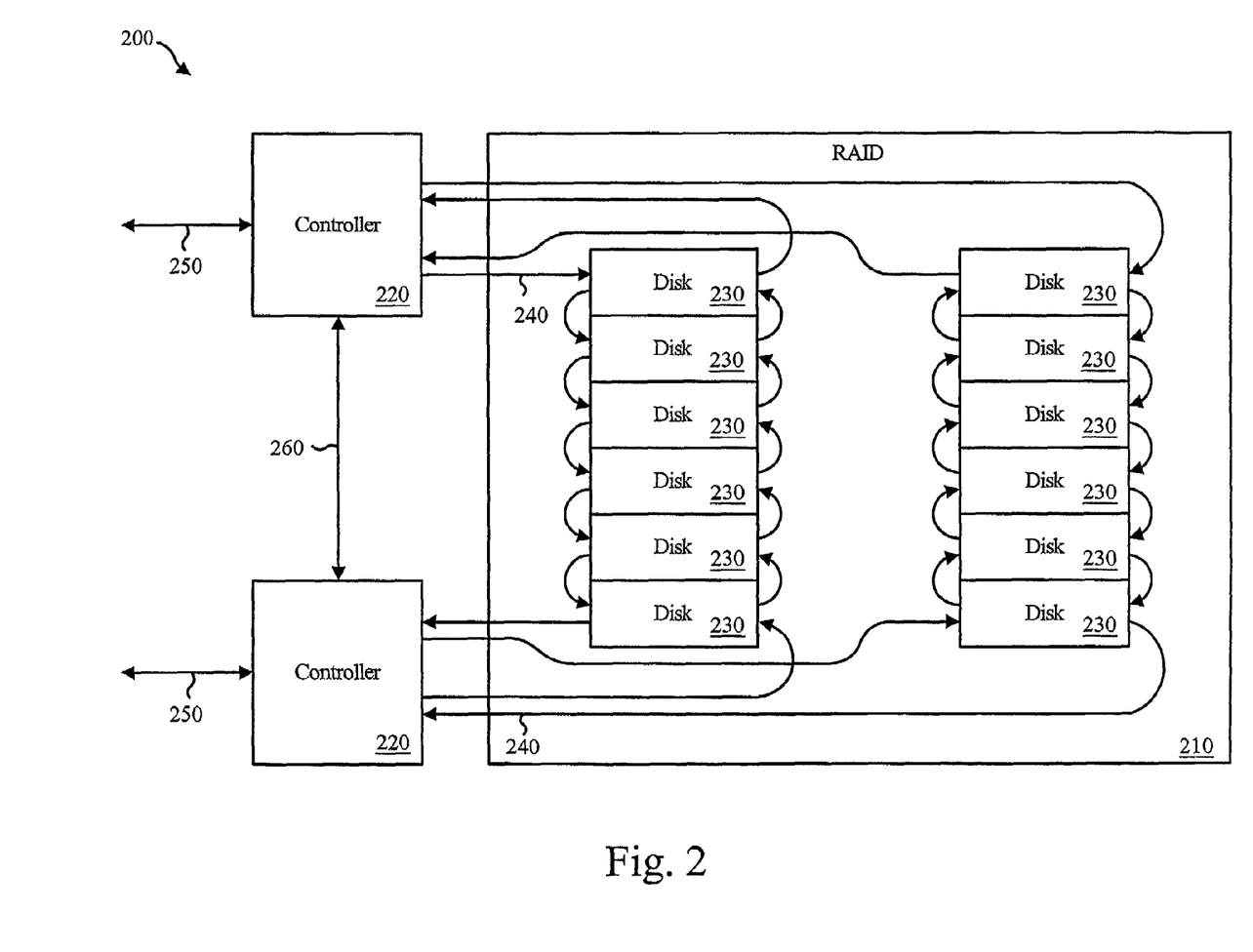
FIG. 2 is a block diagram illustrating a representative RAID system with dual active controllers in accordance with the present invention.

FIG. 2 shows one example of a RAID system 200 illustrating the need for the present invention. The RAID system 200 includes a storage array 210 and one or more RAID controllers 220. The RAID system 200 preferably includes a plurality of RAID controllers 220 in order to achieve increased reliability through redundancy. Additional redundancy is also provided through the inclusion of a number of storage devices 230.

In the depicted embodiment, the storage devices 230 are interconnected with a pair of array loops 240. The array loops 240 also interconnect the RAID controllers 220 with the storage array 210. The array loops 240 circulate communications in complimentary directions to increase reliability. In the depicted embodiment, the array loops 240 are point-to-point loops such as that defined by the fiber channel standard and as is well understood in the art.

In the depicted embodiment, the storage devices 230 and the RAID controllers 220 are dual-ported devices capable of communicating on either array loop 240. Thus, both controllers are connected to all of the disk drives facilitating back-end communications on the same buses on which data transfer occurs. Bi-directional communication provides communication redundancy and enables the RAID system 200 to function fully despite the failure of any single element within the RAID system 200.

In the depicted embodiment, the RAID controllers 220 each support a host connection 250. The RAID controllers 220 receive access requests via the host connection 250 and service those requests by transferring blocks of data to and from the storage array 210. The blocks of data that are transferred to the storage array 210 are redundantly encoded to permit error detection and data recovery in the event of failure of one of the storage devices 230. In certain preferred embodiments, each RAID controller 220 is configured with multiple host connections 250. Additional host connections facilitate a wider variety of connection topologies within a network, and also provide increased reliability due to the additional connection redundancy.

In addition to connection and data redundancy, the RAID controllers 220 preferably support some type of fail-over mechanism. In one embodiment, for example, each of the RAID controllers 220 is a primary controller for the host on the host connection 250 as well as a standby controller for other RAID controllers. One of the standby controllers is activated to assume the load of the primary controller in the event the primary controller fails. In another embodiment, the RAID controllers 220 support load sharing. If a failure occurs in one of the RAID controllers 220, the remaining RAID controllers 220 pick up additional traffic load via the host connection 250.

In a preferred embodiment, the RAID controllers 220 support data caching via an onboard storage cache. Onboard storage cache improves the performance of the RAID system 200. To facilitate quick and reliable recovery in the event of a RAID controller failure, the storage cache on each RAID controller 220 preferably contains mirrored data from one or more other RAID controllers 220. In the event of a power failure, for example, unwritten data is flushed from the storage cache to the storage array 210 while the RAID controller 220 operates on backup power.

In the depicted embodiment, the RAID controllers 220 are interconnected by a dedicated link 260 configured to mirror data that is received from the host connections 250. The present invention provides means and methods to conduct data mirroring as well as backend communications on the dedicated link 260, thereby reducing the bandwidth burden on the array loops 240. Specifically, the present invention facilitates conducting and tracking data transfers over the dedicated link 260, thereby facilitating direct, reliable, and high performance messaging between the RAID controllers 220.

Figure 3:
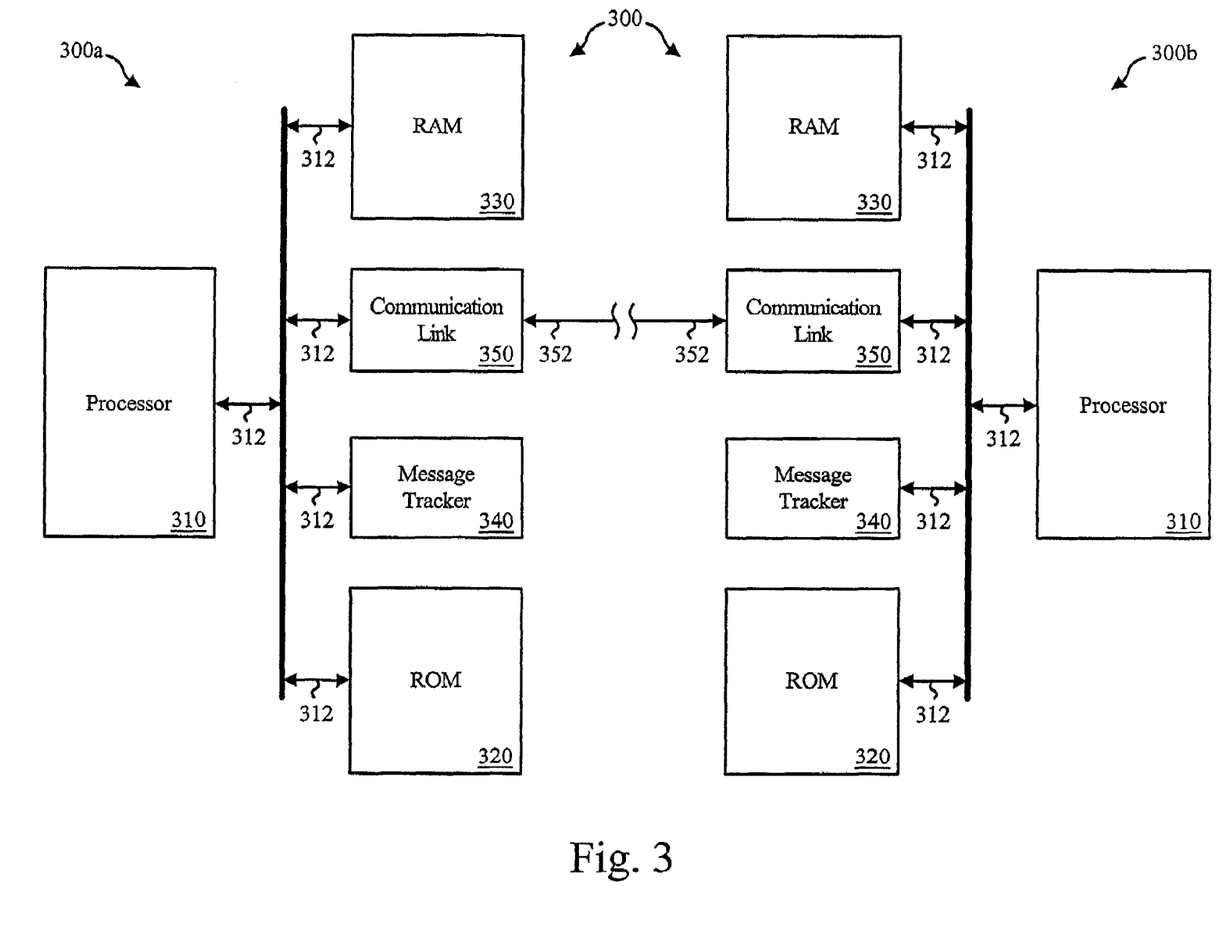
FIG. 3 is a block diagram illustrating one embodiment of a message tracking system of the present invention.

FIG. 3 is a block diagram illustrating one embodiment of a message tracking system 300 of the present invention. The message tracking system 300 facilitates tracking of data transfers related to messaging between a local system 300a and a remote system 300b. In the depicted embodiment, the local system 300a and the remote system 300b are essentially identical for illustration purposes.

In the depicted embodiment, the message tracking system 300 includes a processor 310, a system bus 312, a program memory 320, a data memory 330, and a communication link 350. In addition to the elements typical of digital processing systems, the message tracking system 300 also includes a message tracker 340. The message tracker 340 monitors data transfers on the system bus 312. To send data, the communication link 350 receives data transfers from the system bus 312 and provides data packets 352. When receiving data, the communication link 350 receives the data packets 352 and provides data transfers to the system bus 312.

The system bus 312 may be a multi-tenant bus wherein each tenant is capable of initiating data transfers. The system bus 312 is preferably configured to arbitrate between and distribute bandwidth to the various tenants competing for access to the system bus 312. As a consequence, data transfers related to a message may be interleaved with other data transfers. The message tracker 340 essentially monitors data transfers related to a message and informs a communicator, such as a program or process executing on the processor 310, that communication of the message has occurred. In a preferred embodiment, the monitoring and informing operations of the message tracker 340 are conducted in hardware rather than software.

Figure 4:
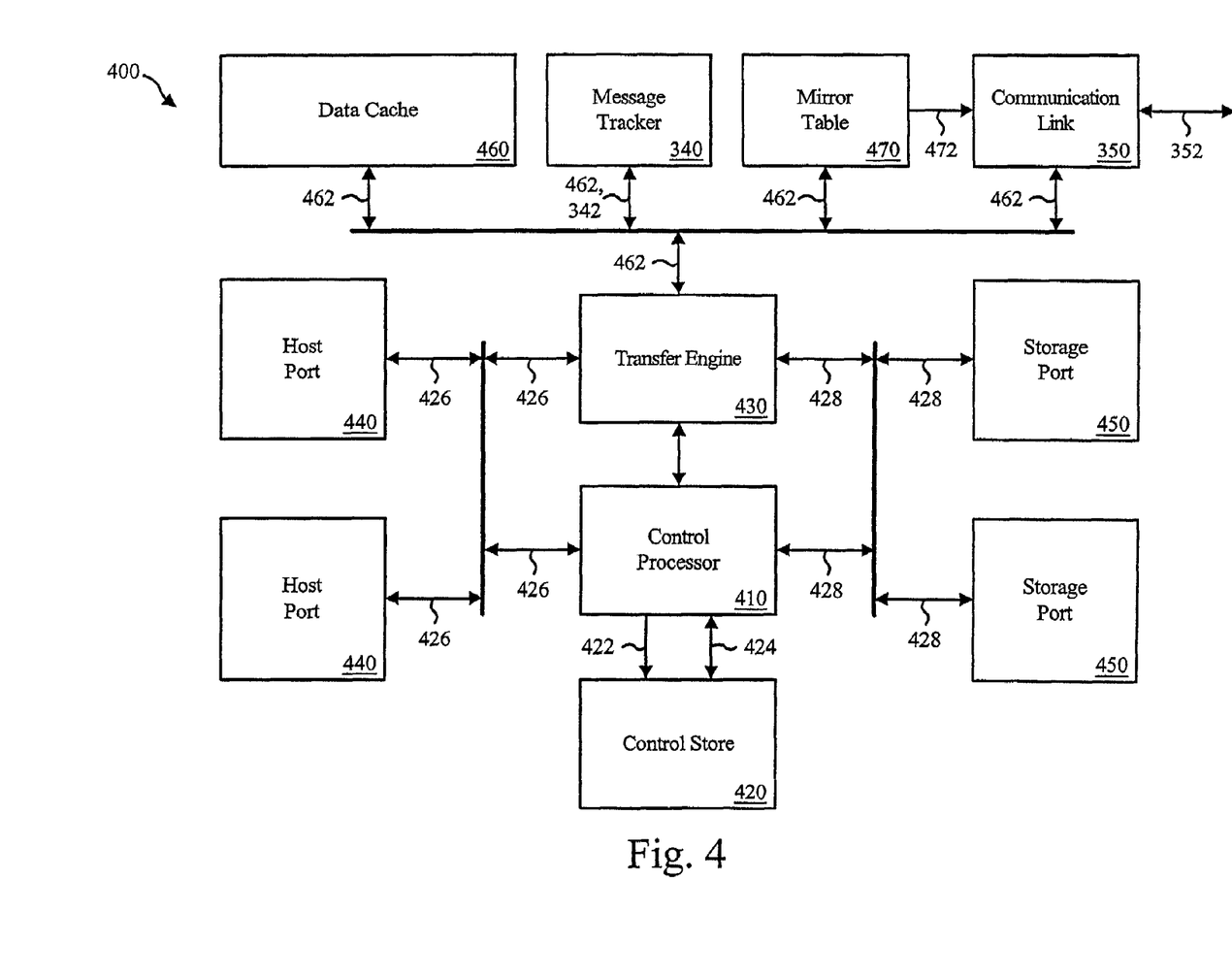
FIG. 4 is a block diagram illustrating one embodiment of a message tracking RAID controller of the present invention.

FIG. 4 is a block diagram illustrating one embodiment of a message tracking RAID controller 400 of the present invention. The message tracking RAID controller 400 is preferably configured to support fault-tolerant systems with data redundancy, active standby, and load sharing capabilities. The aforementioned features require efficient and effective handling of control messages and other communications.

Within the RAID controller 400, a control processor 410 accesses data from a control store 420 via an address bus 422 and a data bus 424. The control processor 410 also configures various devices and accesses configuration information. A host-side data bus 426 and a storage-side data bus 428 are high performance data buses that facilitate the transfer of blocks of data between one or more hosts and a storage array such as the storage array 210 of FIG. 2. In one embodiment, a transfer engine 430 executes the actual transfers within the RAID controller 400 and provides or checks redundancy fields on the transfer data depending of the direction of the transfer.

One or more host ports 440 and one or more storage ports 450 provide access to hosts and storage arrays respectively. A data cache 460 stores and caches data blocks and provides an intermediate transfer point for the transfer engine 430. The transfer engine 430 accesses the data cache 460 through a data cache bus 462.

The message tracking RAID controller 400 also includes the message tracker 340, a mirror table 470, and a communication link 480. In the depicted embodiment, the mirror table 470 provides mirror data 472 to the communication link 480. As depicted, the mirror table 470 and the communication link 480 work together to capture, assemble, transmit, receive, disassemble and present mirror data within the data packets 352 from and to the data cache bus 462. The mirror table 470 facilitates mirroring of selected memory segments and is used to maintain data coherency and to conduct messaging between redundant RAID controllers via the communication link 480.

The mirror table 470 and the communication link 480 may also be used to transfer messages between a local system and a remote system. In the depicted embodiment, the message tracker 340 monitors and tracks data transfers on the data cache bus 462 related to messages. Upon completion of a message, the depicted message tracker 340 informs the control processor 410 of completed message communications, by invoking an interrupt for example. The mirror table 470, the communication link 480, and the message tracker 340 facilitate efficient messaging by the RAID controller 400.

Figure 5:
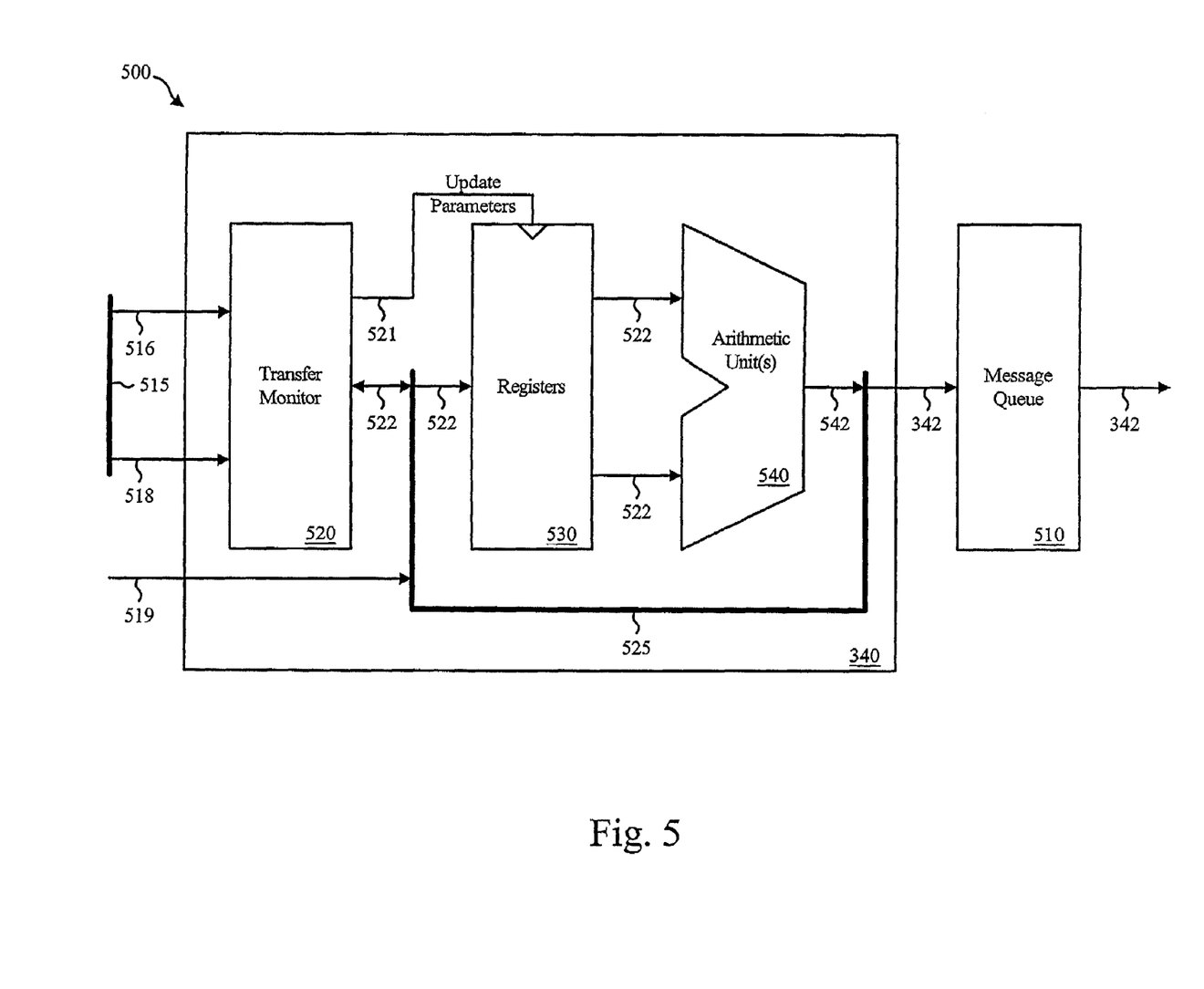
FIG. 5 is a block diagram illustrating one embodiment of a message tracking subsystem of the present invention.

FIG. 5 is a block diagram illustrating one embodiment of a message tracking subsystem 500 of the present invention. The message tracking subsystem 500 includes one or more message trackers 340 and a message queue 510. As depicted, each message tracker 340 includes a transfer monitor 520, a set of registers 530, and one or more arithmetic units 540. The message tracking subsystem 500 preferably contains one message tracker 340 for each simultaneous message that must be tracked.

The message queue 510 receives one or more message parameters 342 from one of the message trackers 340 upon completion of a message. In turn, the message queue 510 provides the received message parameters 342 upon request to a communicator which may be a functional unit or process responsible for messaging.

The message queue 510 facilitates message coalescing. Message coalescing facilitates increased system performance by reducing the frequency of context switches within a control program. In one embodiment, message coalescing is achieved by deferring the invocation of an interrupt until the message queue 510 contains parameters from a selected number of messages. In a second embodiment, message coalescing is achieved by polling the message queue 510 at a selected rate. In a third embodiment, message coalescing is achieved by deferring the invocation of an interrupt for a selected time interval after reception of the message parameters 342 (i.e. completion of a message).

The transfer monitor 520 receives a transfer address 516 and a transfer length 518. A message length 519 is also provided to the message tracker 340. The transfer address 516 and the transfer length 518 are preferably received from a multi-tenant bus 515. In the depicted embodiment, the transfer monitor 520 provides the transfer address 516 and the transfer length 518 as members of a set of message parameters 522 to a message parameter bus 525.

In the depicted embodiment, the transfer monitor 520, the registers 530, and the arithmetic unit(s) 540 are electronically coupled to the message parameter bus 525. The registers 530 provide storage for message related parameters such as a current address, a communicated length, a remaining length, and the message length 519. The message related parameters are selected to facilitate message tracking by the message tracker 340.

The arithmetic unit(s) 540 conduct arithmetic operations to facilitate changes and updates to the message parameters 522.

In the depicted embodiment, the arithmetic unit(s) 540 are dual-port devices that receive pairs of message parameters 522 from the registers 530 and provide updated message parameters 542 to the message parameter bus 525. The number of arithmetic unit(s) 540 selected to comprise the message tracker 340 may vary according to performance and resource restraints. Likewise, the precise interconnection of the arithmetic units 540 to the registers that comprise the registers 530 may be selected to satisfy various engineering constraints such as available logic gates, bus cycle times, implementation technology, and the like.

The transfer monitor 520 is responsible for monitoring activity on a multi-tenant bus such as the system bus 312 of FIG. 3, or the data cache bus 462 of FIG. 4. In response to detecting a transfer relating to a message, the transfer monitor 520 asserts the update signal 521. In the preferred embodiment, assertion of the update signal 521 latches the updated message parameters 522 within the storage registers 530.

Figure 6:
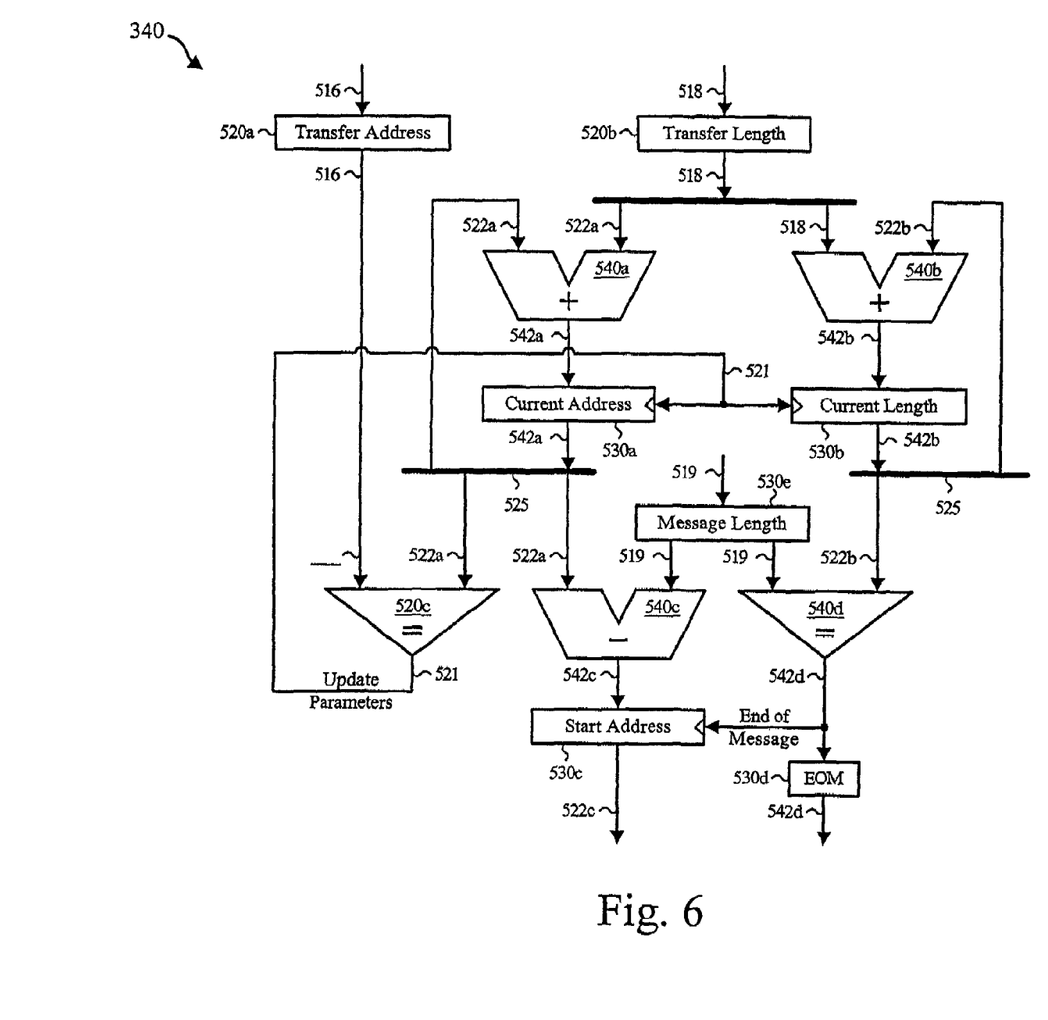
FIG. 6 is a block diagram illustrating one embodiment of a message tracking apparatus of the present invention.

FIG. 6 is a block diagram illustrating in greater detail one embodiment of the message tracker 340. The depicted embodiment is a preferred embodiment for use in the product for which the present invention was developed and should be considered representative of the spirit and intent of the present invention.

The message tracker 340 depicted in FIG. 6 includes a transfer address buffer 520a, a transfer length buffer 520b, and a current address comparator 520c, which collectively comprise the transfer monitor 520 (see FIG. 5). The depicted message tracker 340 also includes the current address adder 540a, a current length adder 540b, a start address subtractor 540c, and a message length comparator 540d, which collectively comprise the arithmetic unit(s) 540. Finally, the depicted message tracker 340 also includes a current address register 530a, a current length register 530b, a start address register 530c, an end-of-message register 530d, and a message length register 530e, which collectively comprise the registers 530.

The current address adder 540a sums a current address 522a and the transfer length 518 to provide an updated current address 542a to the current address register 530a. Likewise, the current length adder 540b sums a current length 522b and the transfer length 518 to provide an updated current length 542b to the current length register 530b. The updated current length 542b represents the portion of the tracked message that has been communicated, that is, the communicated length.

The current address comparator 520c ascertains whether the transfer address 516 and the current address 522a are identical. An identical condition indicates the transfer of additional message data on the multi-tenant bus associated with the message tracker 340. In response to an identical condition, the current address comparator 520c asserts the update signal 521.

Assertion of update signal 521 latches the updated current address 542a and the updated current length 542b into the current address register 530a and the current length register 530b respectively. Once latched, the updated current address 542a and the updated current length 542b are provided to the message parameter bus 525.

In addition to the transfer address 516 and the transfer length 518, the message tracker 340 receives a message length 519 (see center area of FIG. 6). The message length 519 indicates the intended length of the tracked message. While the transfer address 516 and the transfer length 518 are preferably received from a multi-tenant bus, the message length 519 is preferably received from the communication link 350 or 480 when receiving a message, or a processor, such as the processor 310, when transmitting a message.

The message length 519 is stored within the message length register 530e. The start address subtractor 540c subtracts the message length 519 from the current address 522a, to provide the start address 542c. The message length comparator 540d compares the message length 519 with the current length 522b. In an equal condition, the message length comparator 540d asserts an end-of-message signal 542d. The end-of-message signal 542d is received by, and stored within, the end-of-message register 530d. Assertion of the end-of-message signal 542d latches the start address 542c within the start address register 530c.

In the presently preferred embodiment, the start address 542c and the end-of-message signal 542d are provided to the message queue 510. The message queue 510 may handle the received data in the manner conveyed in the description of FIG. 5. In another embodiment, the end-of-message signal 542d is provided directly to a processor such as the control processor 310. The start address 542c and the end-of-message signal 542d may also be provided to the message parameter bus 525.

The embodiment depicted in FIG. 6 reflects the particular message parameters selected to track messages in the presently preferred embodiment. Other parameter selections may result in different registers and different interconnections between the registers and the arithmetic units while maintaining the spirit and intent of the invention. For example, in one embodiment a remaining length is tracked rather than the current or communicated length.

The embodiment depicted in FIG. 6 also reflects certain design choices regarding pipelining and bus coupling. For example, in certain embodiments the buffers 520a and 520b are preferably registers rather than buffers. In other embodiments, the buffers 520a and 520b are omitted to in favor of direct coupling to a multi-tenant bus.

Figure 7:
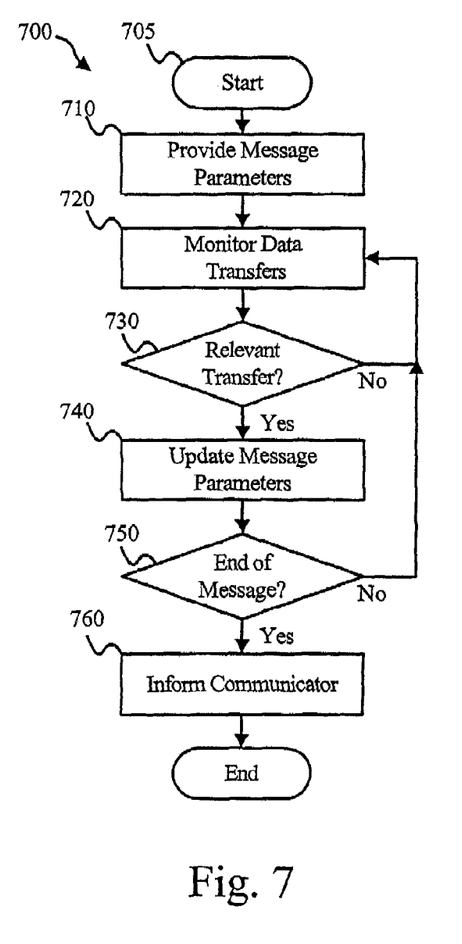
FIG. 7 is a flow chart illustrating one embodiment of a message tracking method of the present invention.

FIG. 7 is a flow chart illustrating one embodiment of a message tracking method 700 of the present invention. The message tracking method 700 may be conducted in conjunction with, or independently of, the message tracker 340.

The message tracking method 700 starts 705 and continues by providing 710 message parameters such as a message address and length. In one embodiment, providing 710 comprises storing a message address and length within a set of registers and initializing a remaining length register to the message length, a current length register to zero, and a current address register to the message address. After providing 710 the message parameters, the method 700 proceeds to monitoring 720 the data transfers.

In the preferred embodiment, monitoring 720 the data transfers comprises monitoring a multi-tenant bus to detect data transfers. In conjunction with monitoring 720 the data transfers, the message tracking method proceeds by testing 730 whether a data transfer is a relevant transfer. In the presently preferred embodiment, testing 730 comprises comparing a transfer address with a current address. If the data transfer is relevant, the message tracking method 700 proceeds by updating 740 the message parameters. Otherwise, the method continues monitoring 720 and testing 730.

In conjunction with updating 740 the message parameters, the message tracking method 700 preferably updates those message parameters that are used to track the progress of message communication. In the presently preferred embodiment, updating 740 comprises updating a current address and a current (i.e. communicated) length by summing the current address and length with a transfer length. In another embodiment, updating 740 the message parameters comprises updating a remaining length by subtracting the transfer length from the remaining length.

In response to updating 740 the message parameters, the message tracking method proceeds by testing 750 whether the tracked message has been completely communicated as indicated by an end-of-message condition. In one embodiment, testing 750 comprises comparing a communicated length with a message length. In another embodiment, testing 750 for an end of message comprises comparing a remaining length with a value of zero. If an end-of-message condition exists, the method proceeds to informing 760 the communicator, otherwise, the method 700 loops back to monitoring 720 data transfers.

In conjunction with informing 760 the communicator, the message tracking method 700 preferably informs a communicator such as a control process or processor that message communication has occurred. In the preferred embodiment, informing 760 the communicator comprises placing message parameters within a message queue such as the message queue 510 of FIG. 5. In another embodiment, informing 760 the communicator comprises asserting an interrupt signal to invoke an interrupt routine.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes within the meaning and range of equivalency of the claims are to be embraced within their scope.

What is claimed is:

1. A method for tracking a message sent from a first computer to a second computer, and tracking said message mirrored from said second computer to a third computer, said message containing data and message parameters including a length of the message, said message being sent from said first computer to said second computer in packets over time, said method comprising the steps of:

said second computer receiving said packets sent from said first computer;

a message tracker in said second computer tracking portions of said message contained in said packets while said portions are transferred on a bus of said second computer, said bus interconnecting a data cache, said message tracker, a mirror table, a transfer engine and a communication link of said second computer, said second computer temporarily storing said portions in said data cache;

said message tracker tracking a combined length of said portions which have been received by said second computer from said first computer, said message tracker subsequently detecting that all of said portions have been received by said second computer, and in response, said message tracker notifying a communication process that all of said message has been received by said second computer, said communication process executing within said second computer;

after said second computer receives some of said portions from said first computer but before said second computer receives all portions of said message from said first computer, said transfer engine transferring said some portions from said data cache to said mirror table, and from said mirror table to said communication link en route to said third computer;

said message tracker tracking a combined length of said portions which have been sent from said second computer to said third computer, said message tracker subsequently detecting that all of said message portions have been sent from said second computer to said third computer, and in response, said message tracker notifying said communication process that all of said message has been sent from said second computer to said third compute;

wherein said message tracker comprises a current address comparator, a current address adder, a current length adder, a start address subtractor and a message length comparator; and wherein said message tracker provides with a single interrupt both said notification to said communication process that all of said message has been received by said second computer, and said notification to said communication process that all of said message has been sent from said computer to said third computer.

2. A method as set forth in claim 1 further comprising the steps of:

said current address adder summing a current address of one of said portions and a transfer length of one of said portions to provide an updated current address; and said current length adder summing a current length of one of said portions and a transfer length of one of said portions to provide an updated current length, said updated current length representing a portion of said message that has yet to be sent to said third computer.

3. A method as set forth in claim 2 further comprising the step of:

said current address comparator determining whether a transfer address of one of said portions and a current address of one of said portions are the same, indicating transfer of an additional portion of said message on said bus.

4. A method as set forth in claim 3 further comprising the steps of:

said start address subtractor subtracting a message length from a current address of one of said portions to determine a start address; and said message length comparator comparing a message length with the current length of said one portion and asserting an end-of message signal in response to said message length equaling said current length.

5. A first Computer for tracking a message received from a second computer and tracking said message mirrored to a third computer, said message containing data and message parameters including a length of the message, said message being received from said second computer in packets over time, said system comprising:

means for receiving said packets sent from said second computer;

a data cache, a message tracker, a mirror table, a transfer engine, a communication link, and a bus interconnecting said data cache, said message tracker, said mirror table, said transfer engine and said communication link;

a communication process;

said message tracker including means for tracking portions of said message contained in said packets while said portions are transferred on said bus;

means for temporarily storing in said data cache said portions received from said second computer;

said message tracker including means for tracking a combined length of said portions which have been received by said first computer, and responsive to detecting that all of said portions have been received by said first computer, notifying said communication process that all of said message has been received by said first computer;

said transfer engine including means responsive to the receiving means receiving some of said portions from said second computer but before receiving all portions of said message from said second computer, for transferring said some portions from said data cache to said mirror table, and from said mirror table to said communication link en route to said third computer;

said message tracker including means for tracking a combined length of said portions which have been sent from said first computer to said third computer, subsequently detecting that all of said message portions have been sent to said third computer, and in response, notifying said communication process that all of said message has been sent to said third computer;

wherein said message tracker provides a single interrupt for both said notification to said communication process that all of said message has been received by said first computer, and said notification to said communication process that all of said message has been sent from said first computer to said third computer; and wherein said message tracker comprises a current address comparator, a current address adder, a current length adder, a start address subtractor and a message length comparator.

6. A system as set forth in claim 5 wherein:

said current address adder is adapted to sum a current address of one of said portions and a transfer length of one of said portions to provide an updated current address; and said current length adder is adapted to sum a current length of one of said portions and a transfer length of one of said portions to provide an updated current length, said updated current length representing a portion of said message that has yet to be sent to said third computer.

7. A system as set forth in claim 6 wherein:

said current address comparator is adapted to determine whether a transfer address of one of said portions and a current address of one of said portions are the same, indicating transfer of an additional portion of said message on said bus.

8. A system as set forth in claim 7 wherein:

said start address subtractor is adapted to subtract a message length from a current address of one of said portions to determine a start address; and said message length comparator is adapted to compare a message length with the current length of said one portion and asserting an end-of-message signal in response to said message length equaling said current length.

* * * * *